(12) United States Patent
Takabayashi et al.

(10) Patent No.: US 11,121,440 B2
(45) Date of Patent: Sep. 14, 2021

(54) ELECTRICITY STORAGE DEVICE

(71) Applicant: SANYO Electric Co., Ltd., Daito (JP)

(72) Inventors: Hiroshi Takabayashi, Hyogo (JP); Hiroyuki Yamada, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 85 days.

(21) Appl. No.: 16/255,461

(22) Filed: Jan. 23, 2019

(65) Prior Publication Data
US 2019/0237742 A1 Aug. 1, 2019

(30) Foreign Application Priority Data

Jan. 26, 2018 (JP) .............................. JP2018-011978

(51) Int. Cl.
*H01M 50/60* (2021.01)
*H01M 50/147* (2021.01)
(Continued)

(52) U.S. Cl.
CPC ....... *H01M 50/60* (2021.01); *H01M 10/0413* (2013.01); *H01M 50/147* (2021.01); *H01M 50/172* (2021.01); *H01M 2220/20* (2013.01)

(58) Field of Classification Search
CPC ........ H01M 2/362; H01M 2/043; H01M 2/06; H01M 10/0413; H01M 50/60; H01M 50/172; H01M 50/147; H01M 2220/20
See application file for complete search history.

(56) References Cited

U.S. PATENT DOCUMENTS

| 2002/0006542 | A1* | 1/2002 | Park | H01M 50/60 |
| | | | | 429/72 |
| 2004/0234846 | A1* | 11/2004 | Han | H01M 50/538 |
| | | | | 429/163 |
| 2016/0056445 | A1 | 2/2016 | Minagata et al. | |

FOREIGN PATENT DOCUMENTS

| JP | 2012-49039 A | 3/2012 |
| JP | 5574003 B1 | 8/2014 |

(Continued)

OTHER PUBLICATIONS

EPO machine generated English translation of JP-2017152322-A (Year: 2017).*

(Continued)

*Primary Examiner* — Christopher P Domone
*Assistant Examiner* — Kimberly Wyluda
(74) *Attorney, Agent, or Firm* — Westerman, Hattori, Daniels & Adrian, LLP

(57) ABSTRACT

Provided is an electricity storage device having a high volumetric energy density and high reliability. The electricity storage device includes: an electrode assembly including first and second electrode plates and a separator interposed therebetween; an exterior housing that houses the electrode assembly; a lid that covers an opening of the exterior housing; and electrode terminals that are electrically connected to the electrode assembly and partially protrude from the lid to the outside. The lid has a liquid injection hole for injecting an electrolytic solution into the exterior housing. A tubular member extending from the lid toward the electrode assembly is provided between the outer surface of the lid and the electrode assembly so as to surround an opening of the liquid injection hole. A covering member connected to the tubular member and interposed between the liquid injection hole and the electrode assembly is provided.

12 Claims, 6 Drawing Sheets

(51) Int. Cl.
*H01M 50/172* (2021.01)
*H01M 10/04* (2006.01)

(56) References Cited

FOREIGN PATENT DOCUMENTS

JP      2017152322 A   *   8/2017
KR    20160096882 A   *   8/2016

OTHER PUBLICATIONS

EPO machine generated English translation of JP-2012049039-A (Year: 2012).*
EPO machine generated English translation of KR-20160096882-A (Year: 2016).*

* cited by examiner

ELECTRICITY STORAGE DEVICE

CROSS REFERENCE TO RELATED APPLICATIONS

The present invention application claims priority to Japanese Patent Application No. 2018-011978 filed in the Japan Patent Office on Jan. 26, 2018, the entire contents of which are incorporated herein by reference.

BACKGROUND OF THE INVENTION

Field of the Invention

The present disclosure relates to an electricity storage device.

Description of Related Art

Electricity storage devices are being used as power sources for driving electric vehicles (EVs), hybrid electric vehicles (HEVs, PHEVs), etc. and as power sources for electronic devices. For example, alkaline secondary batteries and non-aqueous electrolyte secondary batteries are used as these electricity storage devices.

Such an electricity storage device includes, for example, an electrode assembly, an exterior housing (case) that houses the electrode assembly, a lid that covers an opening of the exterior housing, electrode terminals, a liquid injection hole that is a through hole formed in the lid, and a sealing member that seals the liquid injection hole. The electrode assembly includes a positive electrode plate, a negative electrode plate, and a separator.

Each of the electrode terminals is connected to a corresponding one of the positive and negative electrode plates of the electrode assembly and passes through a through hole formed in the lid.

Japanese Patent No. 5574003 (Patent Document 1) discloses an electricity storage device produced by supplying an electrolytic solution to a case though a liquid injection hole in a lid and sealing the liquid injection hole with a sealing member after completion of the supply of the electrolytic solution.

In the above electricity storage device, it is desired to increase its volumetric energy density to thereby increase the capacity of the battery. To achieve this, it is contemplated that the distance between the lid and the electrode assembly is reduced. However, when the distance between the lid and the electrode assembly in the structure described in Patent Document 1 is reduced, the electrolytic solution supplied at a high flow rate to the exterior housing through the liquid injection hole of the lid may strongly impinge on an edge of the electrode assembly. In this case, the impact of the electrolytic solution impinging on the electrode assembly may cause the material of the electrode assembly to be damaged, delaminated, and flaked off.

BRIEF SUMMARY OF THE INVENTION

An object of the present disclosure is to provide an electricity storage device with a high volumetric energy density and high reliability.

An electricity storage device in one aspect of the present disclosure includes: an electrode assembly including a first electrode plate, a second electrode plate, and a separator interposed between the first electrode plate and the second electrode plate; an exterior housing that houses the electrode assembly; a lid that covers an opening of the exterior housing; and electrode terminals that are electrically connected to the electrode assembly and partially protrude from the lid to the outside of the exterior housing, wherein the lid has a liquid injection hole for injecting an electrolytic solution into the exterior housing, wherein a tubular member extending from the lid toward the electrode assembly is provided, the tubular member being disposed between an outer surface of the lid and the electrode assembly so as to surround an opening of the liquid injection hole on a surface of the lid, which surface faces the electrode assembly, and wherein a covering member is provided, the covering member being connected to the tubular member and interposed between the liquid injection hole and the electrode assembly.

In the above aspect of the present disclosure, when the electrolytic solution is supplied to the exterior housing through the liquid injection hole of the lid, the covering member can reduce the flow rate of the electrolytic solution when the electrolytic solution impinges on the electrode assembly within the exterior housing. Therefore, the material of the electrode assembly can be prevented from being damaged, delaminated, and flaked off, so that the electricity storage device obtained has a high volumetric energy density and is highly reliable.

DETAILED DESCRIPTION OF THE INVENTION

Figure 1:
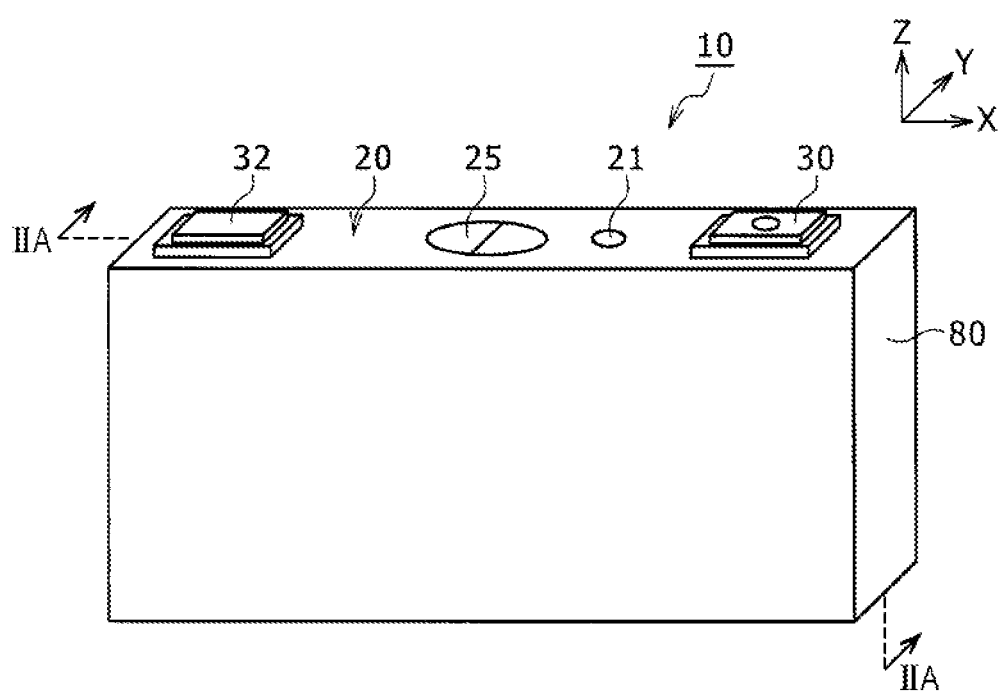
FIG. 1 is a perspective view showing an example of an electricity storage device in an embodiment of the present disclosure.

An electricity storage device in an embodiment will be described. The drawings that will be referred to in the description of the embodiment are illustrated schematically, and the dimensional ratios etc. of components illustrated in the drawings may differ from those of the actual components. In the present specification, the term "substantially" is often used. For example, the term "substantially the same" is intended to mean not only completely the same but also essentially the same. The term "end" is intended to mean an end of an object and its portion near the end. The shapes, materials, and numbers of components described below are examples for illustration and may be changed according to the specifications of the electricity storage device. In the following description, the same parts are denoted by the same symbols.

The electricity storage device described below is used, for example, as a power source for driving an electric vehicle or a hybrid electric vehicle or for a stationary electricity storage system for peak shift applications for grid power.

Figure 2A:
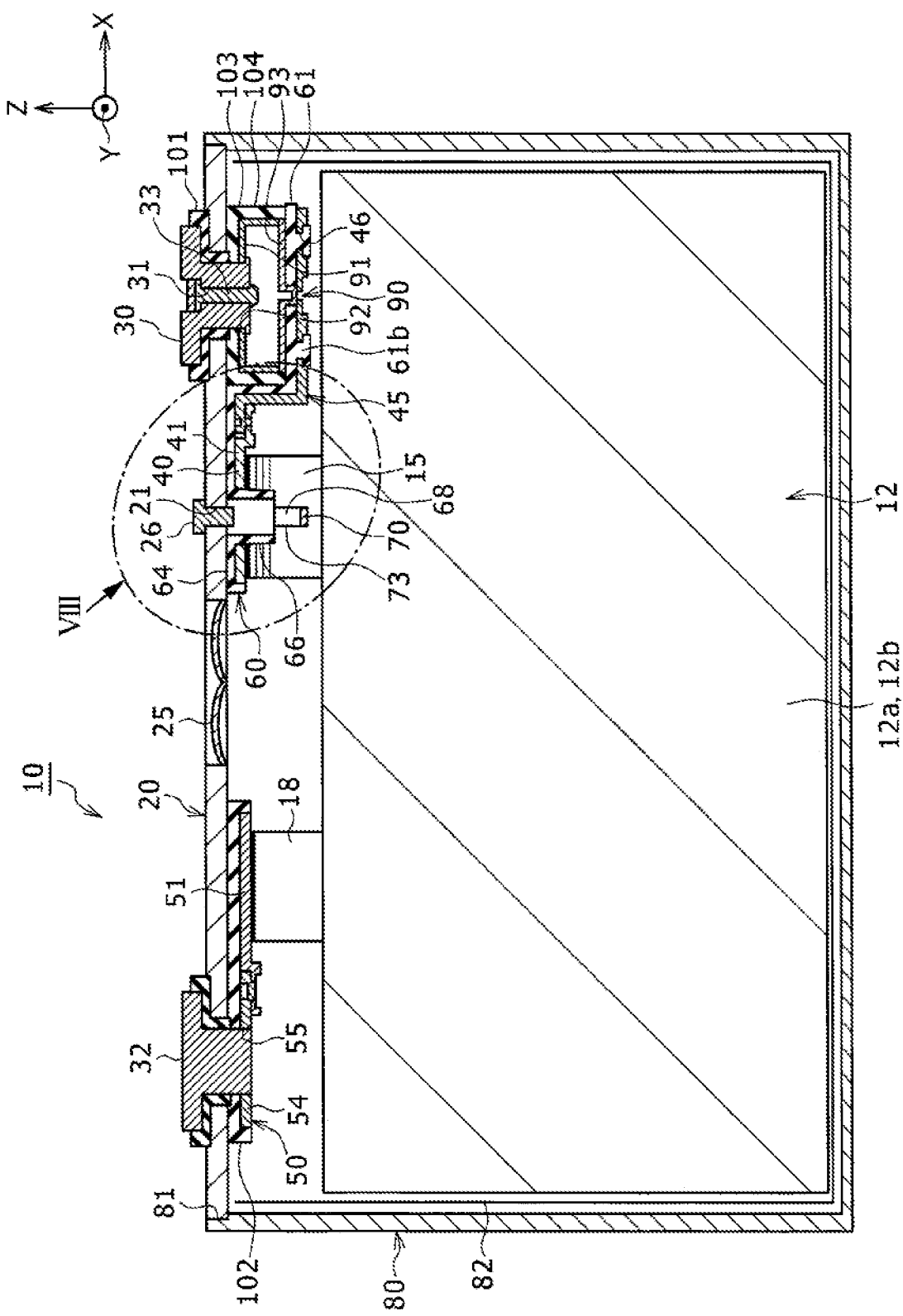
FIG. 2A is a IIA-IIA cross section of FIG. 1.
Figure 2B:
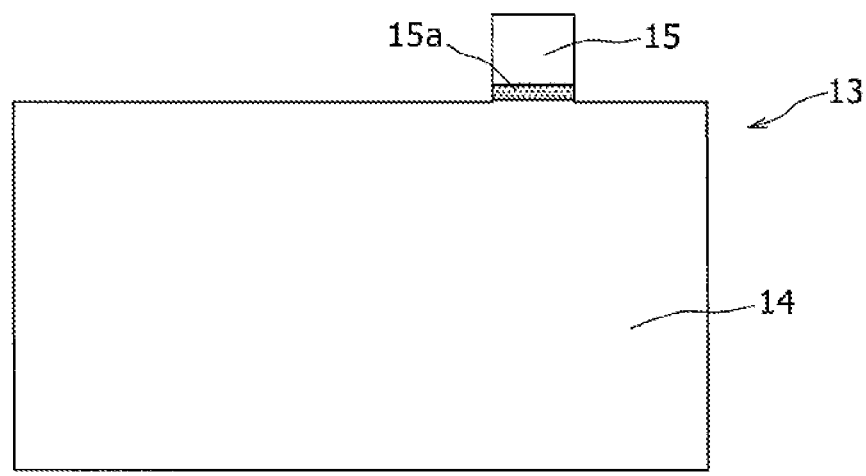
FIG. 2B is an illustration showing a positive electrode plate included in the electricity storage device shown in FIG. 1.
Figure 2C:
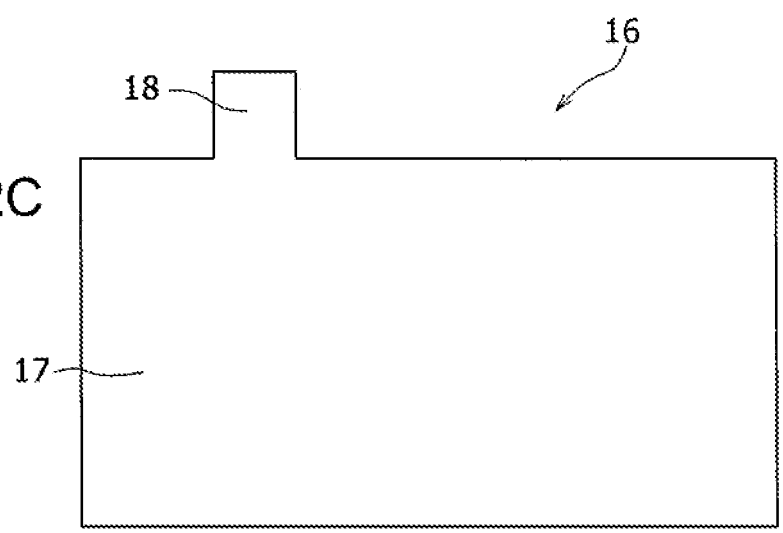
FIG. 2C is an illustration showing a negative electrode plate included in the electricity storage device shown in FIG. 1.
Figure 2D:
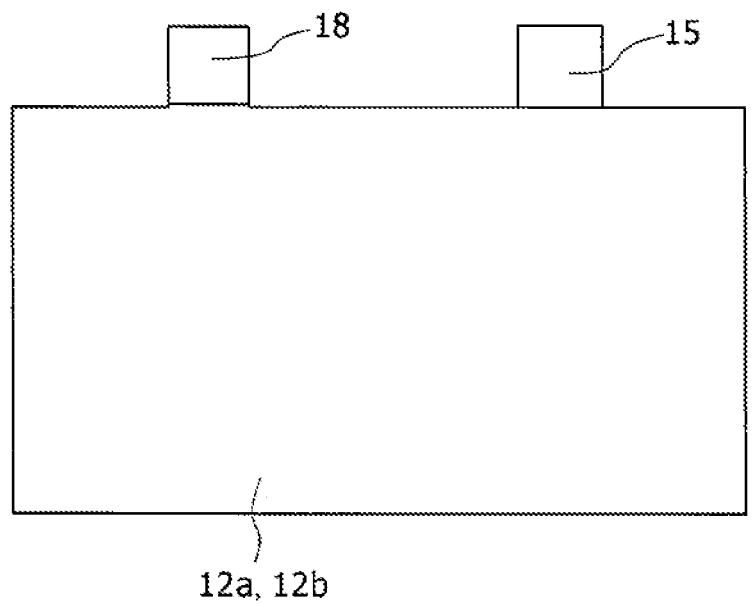
FIG. 2D is an illustration showing an electrode assembly element included in the electricity storage device shown in FIG. 1.
Figure 3:
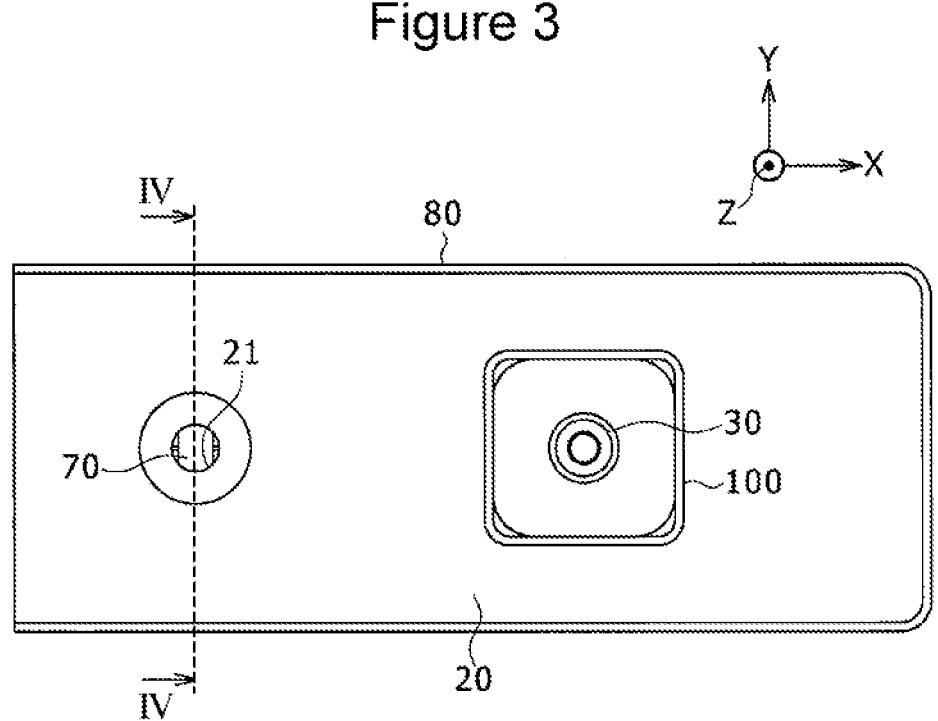
FIG. 3 is a top view of a right end portion in FIG. 1.
Figure 4:
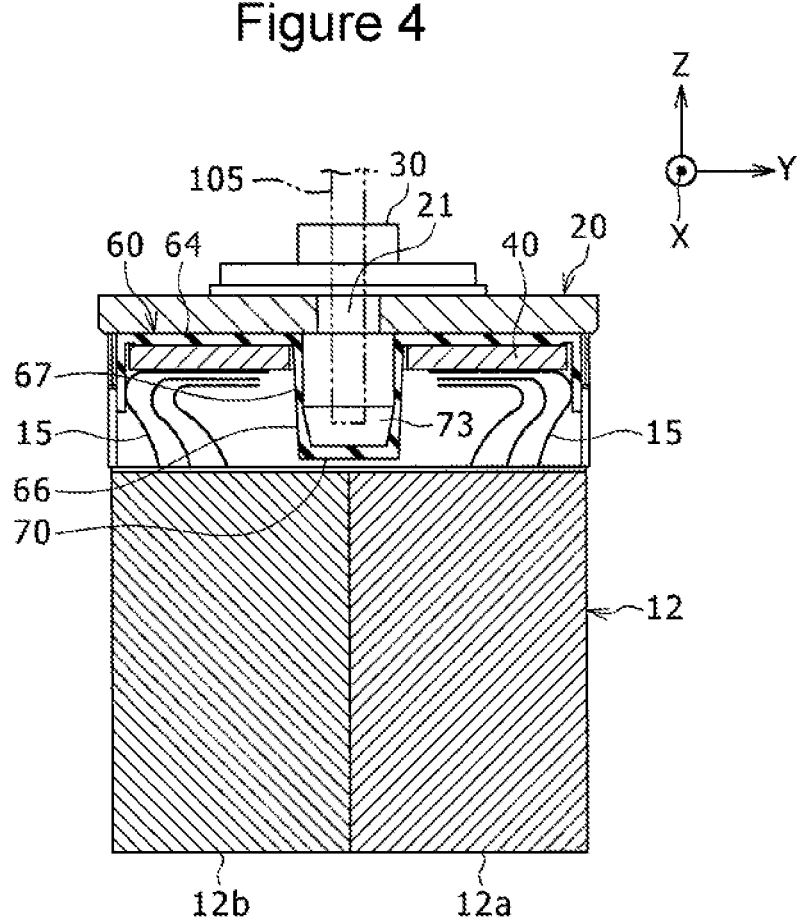
FIG. 4 is a IV-IV cross section of FIG. 3 with some parts omitted.

An example of an electricity storage device 10 in the embodiment will be described in detail with reference to FIGS. 1 to 8. FIG. 1 is a perspective view of the electricity storage device 10. FIG. 2A is a IIA-IIA cross section of FIG. 1. FIG. 2B is an illustration showing a positive electrode plate included in the electricity storage device 10, and FIG. 2C is an illustration showing a negative electrode plate 16 included in the electricity storage device 10. FIG. 2D is an illustration showing an electrode assembly element 12a, 12b included in the electricity storage device 10. FIG. 3 is a top view of a right end portion in FIG. 1. FIG. 4 is a IV-IV cross section of FIG. 3. In FIGS. 1 to 4, the lengthwise direction (horizontal direction) of an exterior housing 80 is represented by X. The thickness direction of the exterior housing 80 is represented by Y, and its vertical direction, i.e., the height direction, is represented by Z. X, Y, and Z are mutually orthogonal. In the following description, the opening side of the exterior housing 80 in the electricity storage device 10 is defined as an upper side, and the bottom side of the exterior housing 80 is defined as a lower side. The terms "upper side" and "lower side" are used for convenience of description.

As shown in FIG. 1, the electricity storage device 10 is a rectangular non-aqueous electrolyte secondary battery and includes an electrode assembly 12 (FIG. 2A) serving as a power generation element, the exterior housing 80, and a lid 20. The electrode assembly 12 includes the positive electrode plate 13 (FIG. 2B), the negative electrode plate 16 (FIG. 2C), and a separator (not shown) interposed between the positive electrode plate 13 and the negative electrode plate 16. The positive electrode plate 13 corresponds to the first electrode plate, and the negative electrode plate 16 corresponds to the second electrode plate.

The exterior housing 80 is a closed end substantially cuboidal member with an opening 81 at its upper end and houses the electrode assembly 12 together with an electrolytic solution (not shown) corresponding to the non-aqueous electrolyte. An insulating sheet 82 (FIG. 2A) is interposed between the electrode assembly 12 and the exterior housing 80. The lid covers the opening 81 of the exterior housing 80. The lid 20 has a rectangular shape with lengthwise and widthwise directions, i.e., is a rectangular plate. The lengthwise direction of the lid 20 coincides with the lengthwise direction X of the exterior housing 80, and the widthwise direction of the lid 20 coincides with the thickness direction Y of the exterior housing 80. A positive electrode terminal 30 and a negative electrode terminal 32 are fixed to the lid 20 so as to partially protrude from the lid 20 to the outside of the exterior housing 80 and are spaced apart from each other in the lengthwise direction X of the lid 20. A liquid injection hole 21 and a discharge valve 25 are formed in an intermediate portion, with respect to the lengthwise direction, of the lid. The liquid injection hole 21 is disposed closer to the positive electrode terminal 30 than the discharge valve 25. The liquid injection hole 21 is a hole for injecting the electrolytic solution into the exterior housing 80. The exterior housing 80 and the lid 20 are each preferably made of a metal and preferably made of, for example, aluminum or an aluminum alloy.

As shown in FIG. 4, the electrode assembly 12 includes two electrode assembly elements 12a and 12b disposed adjacent to each other. Each of the electrode assembly elements 12a and 12b includes a plurality of positive electrode plates 13 and a plurality of negative electrode plates 16 that are alternately stacked with spacers therebetween. In each of the electrode assembly elements 12a and 12b, the positive electrode plates 13 and the negative electrode plates 16 are stacked with the separators therebetween. In the electrode assembly 12, the stacking direction of the positive electrode plates 13, the separators, and the negative electrode plates 16 is orthogonal to the direction from the electrode assembly 12 to the lid 20 and is the thickness direction Y orthogonal to the vertical direction.

The separators used are ion-permeable insulating porous sheets. A preferred example of the electricity storage device 10 is a lithium ion battery.

As shown in FIG. 2B, each positive electrode plate 13 includes a main body 14 including, for example, a rectangular core formed from aluminum foil and active material mixture layers formed on both sides of the core. A positive electrode tab 15 is provided on the positive electrode plate 13. On a first side, with respect to the lengthwise direction, of the main body 14 of the positive electrode plate 13 (on the right side in FIG. 2B), the positive electrode core protrudes from the upper edge of the positive electrode plate 13. The protruding core forms the positive electrode tab 15. The positive electrode tab 15 is electrically connected through a positive electrode current collector 40 (FIG. 4) described later to the positive electrode terminal 30 fixed to the lid 20.

The positive electrode tab may be part of the core as described above but may be prepared by connecting another member to the core of the main body 14 of the positive electrode plate 13 so as to protrude from the core. As shown in FIG. 2B, it is preferable that a protective layer 15a having a larger electric resistance than the active material mixture layers is provided in a portion of the positive electrode tab 15 that is adjacent to the active material mixture layers. It is preferable that the protective layer 15a contains ceramic particles such as alumina, silica, or zirconia particles and a binder. It is more preferable that the protective layer 15a contains conductive particles such as a carbon material.

The active material mixture layers in the positive electrode plate 13 contain, for example, an active material, a conductive agent, and a binder. The active material used for the positive electrode plate 13 may be lithium-nickel-cobalt-manganese composite oxide, and the binder used may be polyvinylidene fluoride (PVdF). The conductive agent used may be a carbon material, and N-methylpyrrolidone (NMP) may be used as a dispersion medium.

Next, a method for producing the positive electrode plate 13 will be described. First, a slurry containing the active material, the conductive agent, the binder, and the dispersion medium described above is prepared. This slurry is applied to both sides of the core of the positive electrode plate. The slurry applied to the positive electrode plate is dried to remove the dispersion medium in the slurry, and the active material mixture layers are thereby formed on the core. Then the active material mixture layers are subjected to compression treatment to adjust their thickness to a prescribed value. The thus-obtained positive electrode plate 13 is cut into a prescribed shape.

As shown in FIG. 2C, each negative electrode plate 16 includes a main body 17 including, for example, a rectangular core formed from aluminum foil and active material mixture layers formed on both sides of the core. A negative electrode tab 18 is provided on the negative electrode plate 16. On a second side, with respect to the lengthwise direction, of the main body 17 of the negative electrode plate 16 (on the left side in FIG. 2C), the negative electrode core protrudes from the upper edge of the negative electrode plate 16. The protruding core forms the negative electrode tab 18. The negative electrode tab 18 is electrically connected through a negative electrode collector 50 (FIG. 2A) described later to the negative electrode terminal 32 fixed to the lid 20.

The negative electrode tab may be part of the core as described above but may be prepared by connecting another member to the core of the main body 17 of the negative electrode plate 16 so as to protrude from the core.

The active material mixture layers in the negative electrode plate 16 contain, for example, an active material, a conductive agent, a binder, and a thickener. The active material used for the negative electrode plate 16 may be graphite, and the binder used may be styrene-butadiene rubber (SBR). The thickener used may be carboxymethyl cellulose (CMC), and water may be used as a dispersion medium.

Next, a method for producing the negative electrode plate 16 will be described. First, a slurry containing the active material, the conductive agent, the binder, and the thickener described above is prepared. This slurry is applied to both sides of the core of the negative electrode plate. The slurry applied to the negative electrode plate is dried to remove the dispersion medium in the slurry, and the active material mixture layers are thereby formed on the core. Then the active material mixture layers are subjected to compression treatment to adjust their thickness to a prescribed value. The thus-obtained negative electrode plate 16 is cut into a prescribed shape.

A plurality of (e.g., 50) positive electrode plates 13 and a plurality of (e.g., 51) negative electrode plates 16 are produced by the above methods, and the positive electrode plates and the negative electrode plates are stacked with polyolefin-made rectangular separators therebetween. The two stacked electrode assembly elements 12a and 12b (FIG. 2D) are produced in the manner described above. Each of the two electrode assembly elements 12a and 12b is produced such that the positive electrode tabs 15 are stacked on the first side with respect to the lengthwise direction X at the upper edge of the electrode assembly element and the negative electrode tabs 18 are stacked on the second side with respect to the lengthwise direction X at the upper edge of the electrode assembly element. Separators are disposed on both side faces, with respect to the thickness direction Y, of each of the two electrode assembly elements 12a and 12b, and the positive electrode plates 13, the negative electrode plates 16, and the separators stacked together are fixed using, for example, a tape. Alternatively, bonding layers may be disposed on the separators. In this case, the separators are bonded to the positive electrode plates 13 and to the negative electrode plates 16. In FIG. 4, only some of the plurality of positive electrode tabs 15 are shown.

As shown in FIGS. 2A and 4, the electricity storage device 10 further includes: the positive electrode terminal 30 and the negative electrode terminal 32 that pass through their respective holes in the lid 20; the positive electrode current collector 40; the negative electrode collector 50; a current collector holder 60; and a safety device 90. The positive electrode terminal 30 and the negative electrode terminal 32 correspond to the electrode terminals. The positive electrode current collector 40 electrically connects the positive electrode terminal 30 to the electrode assembly 12 through the safety device 90. The negative electrode collector 50 (FIG. 2A) electrically connects the negative electrode terminal 32 to the electrode assembly 12.

At the upper edge of the electrode assembly 12, i.e., its edge toward the lid 20, the plurality of positive electrode tabs 15 stacked together and the plurality of negative electrode tabs 18 stacked together are connected to the positive electrode current collector 40 and the negative electrode collector 50, respectively. The positive electrode tabs 15 are connected to the positive electrode current collector 40, and the negative electrode tabs 18 are connected to the negative electrode collector 50.

As shown in FIG. 2A, the positive electrode current collector 40 includes: a first current collector plate 41 connected to the positive electrode tabs 15; and a second current collector plate 45 connected to the first current collector plate 41 and the safety device 90. The first current collector plate 41 and the second current collector plate 45 are connected to each other by placing their ends one on another and welding them together.

The negative electrode collector 50 includes: a first current collector plate 51 connected to the negative electrode tabs 18; and a second current collector plate 54 connected to the first current collector plate 51 and the negative electrode terminal 32. The first current collector plate 51 and the second current collector plate 54 are connected to each other by placing their ends one on another and welding them together.

The positive electrode tabs 15 are connected to the lower surface of the first current collector plate 41 of the positive electrode current collector 40, i.e., the surface of the first current collector plate 41 that faces the electrode assembly 12, and these positive electrode tabs 15 are bent. The negative electrode tabs 18 are connected to the lower surface of the first current collector plate 51 of the negative electrode collector 50, i.e., the surface of the first current collector plate 51 that faces the electrode assembly 12, and these negative electrode tabs 18 are bent. This allows the space between the electrode assembly 12 and the current collectors 40 and 50 to be reduced, and the secondary battery obtained can have a high volumetric energy density.

The current collector holder 60 is disposed between the first current collector plate 41 of the positive electrode current collector 40 and the lid 20. The current collector holder 60 corresponds to the insulating member in the claims. The current collector holder 60 includes a tubular member 66 that is disposed at a position corresponding to the positive electrode tabs 15 in the lengthwise direction X and is formed so as to surround the opening of the liquid injection hole 21 on the lower surface of the lid 20, i.e., the surface of the lid 20 that faces the electrode assembly 12. The tubular member 66 extends from the lid 20 toward the electrode assembly 12. A covering member 70 interposed between the electrode assembly 12 and the lid 20 is connected to the end of the tubular member 66 that faces the electrode assembly 12. This allows the electricity storage device 10 obtained to have a high volumetric energy density and high reliability as described later. The current collector holder 60 will be described later in detail.

The positive electrode terminal 30 is fixed to the lid 20 through an outer insulating member 101 made of resin. A through hole 31 is formed in the positive electrode terminal 30 and is sealed with a sealing member 33. The negative electrode terminal 32 is fixed to the lid 20 through an outer insulating member made of resin. The positive electrode terminal 30 and the negative electrode terminal 32 are each made of, for example, a metal. The positive electrode terminal 30 is made of, for example, aluminum or an aluminum alloy. The negative electrode terminal 32 are made of, for example, copper or a copper alloy. More preferably, the negative electrode terminal 32 has a portion made of copper or a copper alloy and disposed inside the exterior housing 80 and a portion made of aluminum or an aluminum alloy and disposed outside the exterior housing 80.

Preferably, the surface of the negative electrode terminal 32 is plated with, for example, nickel. A hole 55 is formed in the second current collector plate 54 of the negative electrode collector 50. The lower end of the negative electrode terminal 32 is inserted into the hole 55 and crimped to thereby fix the second current collector plate 54 to the lid 20. In this case, the second current collector plate 54 is fixed to the lid 20 with an insulating plate 102 interposed between the lid 20 and the second current collector plate 54. The insulating plate 102 extends beyond the first current collector plate 51 so as to be interposed between the lid 20 and the first current collector plate 51 of the negative electrode collector 50.

The safety device 90 shown in FIG. 2A is a current breaking mechanism that is activated, for example, when the pressure inside the exterior housing 80 reaches a prescribed value or higher and breaks a conductive path between the positive electrode terminal 30 and the positive electrode plates 13 of the electrode assembly 12 (FIG. 2B).

The safety device 90 includes: a bowl-shaped conductive member 91 fixed to a lower end portion of the positive electrode terminal 30 that protrudes downward from the lid 20; and an invertible plate 93. The bowl-shaped conductive member 91 has a hole 92 at its bottom. The lower end portion of the positive electrode terminal 30 is inserted into the hole 92 and is crimped, and the conductive member 91, together with the positive electrode terminal 30, is fixed to the lid 20. In this case, the conductive member 91 is fixed to the lid 20 with an insulating plate 103 interposed between the lid 20 and the conductive member 91.

The invertible plate 93 is a disk having a protrusion at its center. This invertible plate 93 is disposed so as to cover a lower opening of the conductive member 91, and the peripheral edge of the invertible plate 93 and the edge of the opening of the conductive member 91 are joined together by welding. The protrusion at the center of the invertible plate 93 is fitted into a hole formed in the second current collector plate 45 of the positive electrode current collector 40, and the invertible plate 93 is thereby connected to the second current collector plate 45. Therefore, the invertible plate 93 is electrically connected to the conductive member 91 and the second current collector plate 45. It is unnecessary that the protrusion at the center of the invertible plate 93 be fitted into the hole of the second current collector plate, and the protrusion may be joined and electrically connected to the surface of the second current collector plate 45 that faces the lid 20.

The safety device 90 may be disposed in a conductive path between the negative electrode terminal 32 and the negative electrode plates 16 of the electrode assembly 12. The conductive member 91 and the invertible plate 93 are each made of a metal. When connected to the positive electrode terminal 30, the conductive member 91 and the invertible plate 93 are each made of, for example, aluminum or an aluminum alloy. When connected to the negative electrode terminal 32, the conductive member and the invertible plate are each made of, for example, copper or a copper alloy.

It is preferable that the electricity storage device 10 includes the safety device. However, in the present disclosure, it is not compulsory that the safety device be provided, and the safety device may be omitted.

The discharge valve 25 is further provided in the lid 20. The discharge valve 25 breaks when the pressure inside the exterior housing 80 reaches a prescribed value or higher to discharge gas inside the exterior housing 80 to the outside of the exterior housing 80. The operating pressure of the discharge valve 25 is set to be higher than the operating pressure of the safety device 90.

The liquid injection hole 21 (FIG. 4) is further provided in the lid 20. After the electrolytic solution is injected into the exterior housing 80 through the liquid injection hole 21, the liquid injection hole 21 is plugged with a rivet serving as a plug 26 (FIG. 2A). When the electrolytic solution is injected, a straw-shaped (tubular) nozzle 105 (FIG. 4) is inserted into the liquid injection hole 21, and the electrolytic solution is injected into the exterior housing 80 through the nozzle 105.

Figure 5:
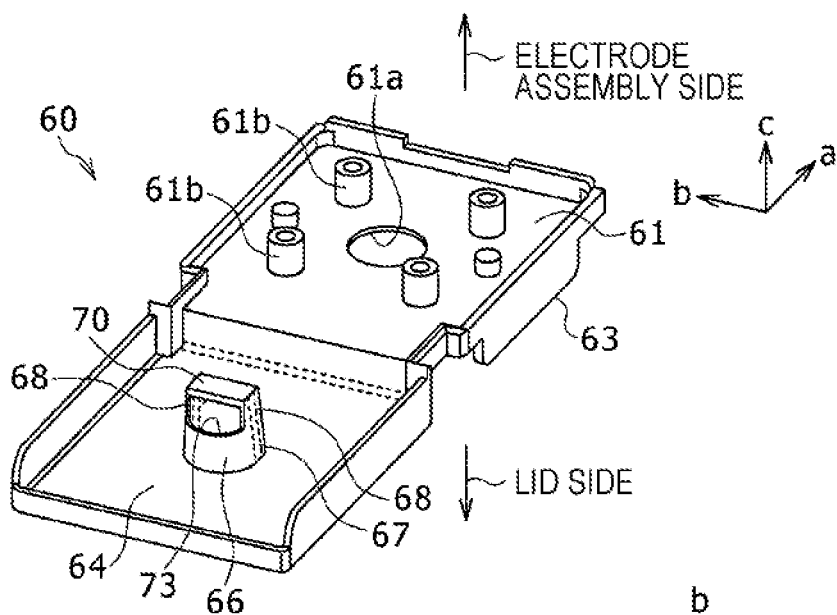
FIG. 5 is a perspective view of a current collector holder used in the electricity storage device shown in FIG. 1.
Figure 6:
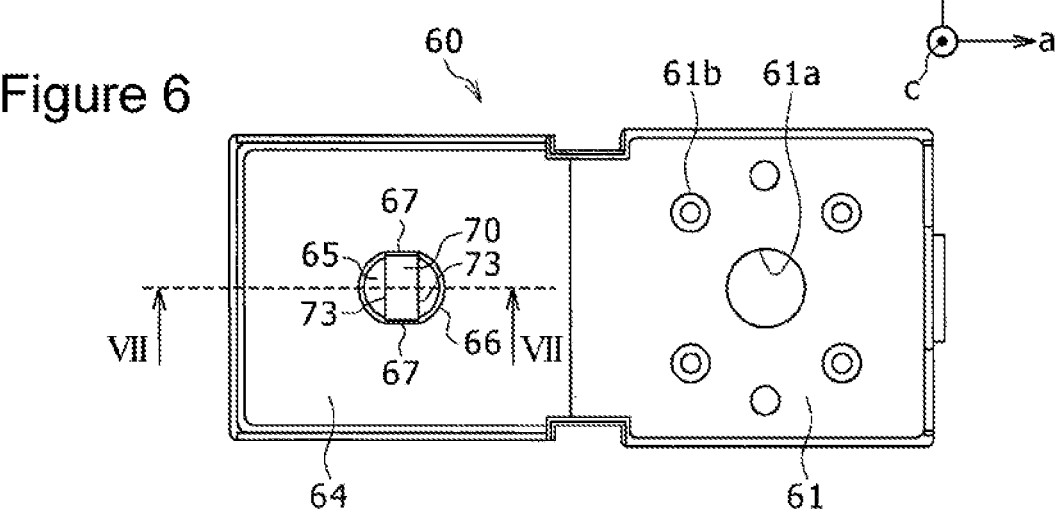
FIG. 6 is a top view of FIG. 5.
Figure 7:
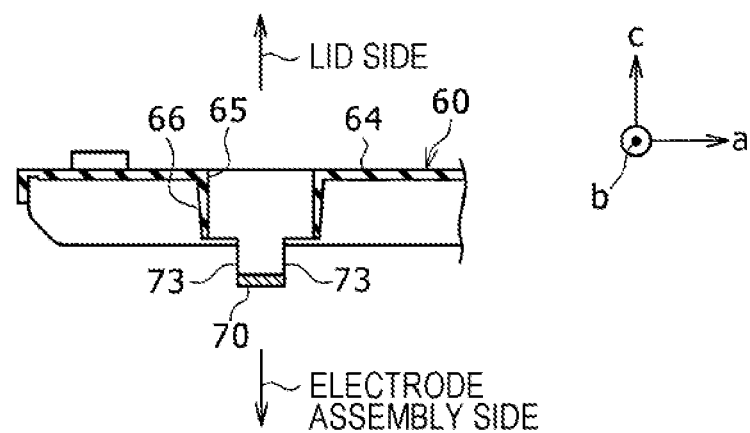
FIG. 7 is a VII-VII cross section of FIG. 6.
Figure 8:
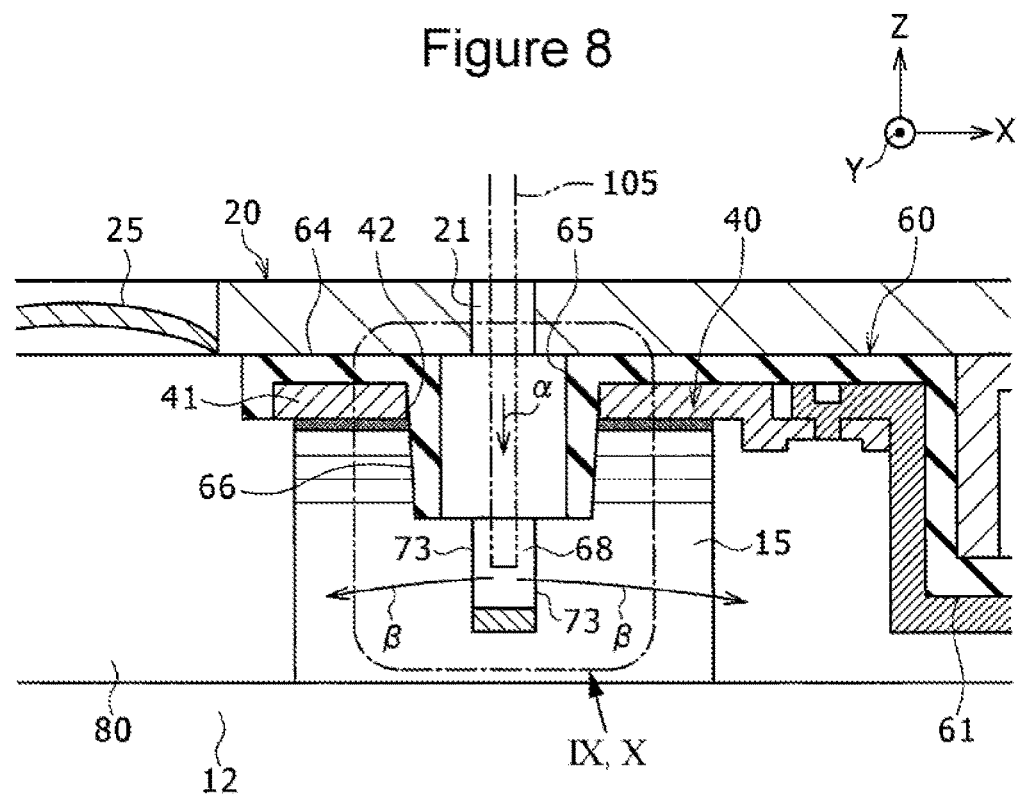
FIG. 8 is an enlarged view corresponding to region VIII in FIG. 2A, showing how an electrolytic solution is supplied to an exterior housing through a liquid injection hole.

As shown in FIGS. 2A, 4, and 8, the electricity storage device 10 further includes the resin-made current collector holder 60 including a first insulating portion 61 and a second insulating portion 64. FIG. 5 is a perspective view of the current collector holder 60. FIG. 6 is a top view of FIG. 5. FIG. 7 is a VII-VII cross section of FIG. 6. FIG. 8 is an enlarged view corresponding to region VIII in FIG. 2A, showing how the electrolytic solution is supplied to the exterior housing 80 through the liquid injection hole 21.

The first insulating portion 61 of the current collector holder 60 is interposed between the second current collector plate 45 of the positive electrode current collector 40 and the invertible plate 93. The second insulating portion 64 of the current collector holder 60 is interposed between the first current collector plate 41 of the positive electrode current collector 40 and the lid 20. In FIGS. 5 to 7, "a" denotes the lengthwise direction of the current collector holder 60. "b" denotes the widthwise direction, and "c" denotes the height direction. "a," "b," and "c" are orthogonal to each other. The current collector holder 60 is disposed below the lid 20 with the lengthwise direction "a" coinciding with the lengthwise direction X of the electricity storage device 10, the widthwise direction "b" coinciding with the thickness direction Y of the electricity storage device 10, and the height direction "c" coinciding with the vertical direction Z.

The second current collector plate 45 (FIG. 2A) is supported below the first insulating portion 61. The first insulating portion 61 is engaged with the outer surface of a tubular member 104 formed on the insulating plate 103. The bowl-shaped conductive member 91 is fitted into the tubular member 104. The positive electrode current collector 40 is thereby fixed to the lid 20. Specifically, a plurality of hooks (not shown) are formed on the back surface of the first insulating portion 61 (the upper surface in FIG. 2A and the lower surface in FIG. 5), the back surface being opposite to the surface of the first insulating portion 61 that faces the second current collector plate 45. Outer circumferential flanges (not shown) are formed at the lower end of the conductive member 91 and the outer circumference of the invertible plate 93, and the plurality of hooks and portions of the back surface of the first insulating portion 61 that differ from the hooks hold the outer circumferential flanges from both the upper and lower sides. Moreover, wall-shaped engagement portions 63 (FIG. 5) extending vertically toward the lid 20 are formed on opposite edges, with respect to the widthwise direction "b," of the back surface of the first insulating portion 61. The engagement portions 63 are engaged with the outer surface of the tubular member 104 on the insulating plate 103 through protrusions (not shown) formed on the inner surfaces of the engagement portions 63. The current collector holder 60 is thereby fixed to the lid 20 through the insulating plate 103. A hole 61a (FIGS. 5 and 6) is formed in the first insulating portion 61 so as to pass therethrough in the height direction "c," and the protrusion at the center of the invertible plate 93 is connected to the second current collector plate 45 through the hole 61a.

A plurality of cylindrical protrusions 61b are formed on the surface of the first insulating portion 61 that faces the electrode assembly at positions around the hole 61a. The plurality of protrusions 61b are inserted into a plurality of holes 46 (FIG. 2A) formed in the second current collector plate 45. After the plurality of protrusions 61b are inserted into the plurality of holes 46, portions of the protrusions 61b that protrude from the holes 46 are deformed by heat crimping, and the second current collector plate 45 is thereby fixed to the first insulating portion 61.

As shown in FIG. 8, the second insulating portion 64 of the current collector holder 60 and the first current collector plate 41 of the positive electrode current collector 40 are disposed near the circumferential edge of the liquid injection hole 21 of the lid 20. The first current collector plate 41 has a through hole 42 extending in the vertical direction Z on a surface facing the second insulating portion 64. As shown in FIGS. 6 and 8, the second insulating portion 64 has a hole 65 passing therethrough in the vertical direction Z, i.e., the height direction "c," at a position aligned with the through hole 42 of the first current collector plate 41. The hole 65 has an elliptical shape longer in the lengthwise direction "a" of the current collector holder 60. The tubular member 66 extending from the lid 20 side toward the electrode assembly 12 is formed on the surface of the second insulating portion 64 that faces the electrode assembly 12 at the circumferential edge of the opening of the hole 65. The tubular member 66 has, on its outer circumferential surface, two parallel flat portions 67 and has an elliptical cross-sectional shape longer in the lengthwise direction "a" that corresponds to the shape of the hole 65. Therefore, the tubular member 66 extends downward, i.e., in the direction from the lid 20 toward the electrode assembly 12, so as to surround the opening of the liquid injection hole 21 on the lower surface of the lid 20 that faces the electrode assembly. The tubular member 66 is disposed between the electrode assembly 12 and the upper surface of the lid 20, i.e., its outer surface. The tubular member 66 is inserted into the through hole 42 of the first current collector plate 41. When the positive electrode tabs 15 are joined to the surface of the first current collector plate 41 that faces the electrode assembly 12, the forward ends of the positive electrode tabs 15 face the flat portions 67, i.e., side surfaces, of the outer circumferential surface of the tubular member 66.

Since the tubular member 66 is provided, when the positive electrode tabs 15 are joined to the first current collector plate 41, the forward ends of the positive electrode tabs 15 can be prevented from being accidentally disposed below the through hole 42 of the first current collector plate 41. Moreover, the lower end of the liquid injection hole 21 can be prevented from being covered with the positive electrode tabs 15.

In the tubular member 66, a covering member 70 interposed between the electrode assembly 12 and the liquid injection hole 21 is connected to the opening edge of the tubular member 66 that faces the electrode assembly 12. Specifically, two substantially parallel plate-shaped protrusions 68 extending downward, i.e., toward the electrode assembly 12, are formed at two opposite edges of the tubular member 66 that face the electrode assembly 12. Opposite ends, with respect to the widthwise direction "b," of the slim flat plate-shaped covering member 70 are connected to the forward ends of the two protrusions 68. The covering member 70 is a plate extending linearly in the widthwise direction "b." The widthwise direction "b" is parallel to the widthwise direction of the lid 20 (FIGS. 1 and 2A) and corresponds to the first direction in the claims. The tubular member 66 has opposite ends with respect to the direction from the lid 20 toward the electrode assembly 12, and the covering member 70 is formed at the end that faces the electrode assembly 12. Two openings 73 are formed between the covering member 70 and the side edges of the tubular member 66 that face the electrode assembly 12. The openings 73 are outlets for injecting the electrolyte flowing from the lid 20 through the tubular member 66 toward the electrode assembly 12. As shown in FIGS. 4 and 8, with the current collector holder 60 attached below the lid 20, the opposite surfaces, with respect to the vertical direction Z, of the covering member 70 are parallel to a plane orthogonal to the vertical direction Z. The covering member 70 changes the direction of the flow of the electrolytic solution that impinges on the covering member 70 from above, i.e., the lid 20 side, to a direction different from the downward direction, i.e., the direction toward the electrode assembly 12.

As shown in, for example, FIG. 8, when the electrolytic solution is supplied to the exterior housing 80 through the liquid injection hole 21, the nozzle 105 is inserted into the liquid injection hole 21 from above through the lid 20. In this case, the lower end of the nozzle 105 faces the upper surface of the covering member 70 with a gap therebetween. Then the electrolytic solution is caused to flow from above through the nozzle 105 in a direction indicated by an arrow α in FIG. 8. The electrolytic solution injected from the lower end of the nozzle 105 impinges on the upper surface of the covering member 70, and the direction of the flow of the electrolytic solution is changed from the direction indicated by the arrow α in FIG. 8 to directions indicated by arrows β in FIG. 8 that are substantially parallel to the lengthwise direction X. The resulting flows pass through the two openings 73, are injected to the outside of the tubular member in directions substantially parallel to the lengthwise direction X, and then directed downward.

Next, a method for attaching the positive electrode terminal 30, the safety device 90, and the positive electrode current collector 40 to the lid 20 will be described using FIG. 2A. The positive electrode terminal 30 is inserted into a hole of the lid 20 through the outer insulating member 101, and the portion of the positive electrode terminal 30 that extends toward the electrode assembly 12 is inserted into the hole 92 of the conductive member 91 through the insulating plate 103. The end portion of the positive electrode terminal 30 that faces the electrode assembly 12 is crimped to fix the positive electrode terminal 30 to the lid 20. Then the circumferential edge of the invertible plate 93 is joined to the opening edge of the conductive member 91. Next, the conductive member 91 is fixed to the first insulating portion 61 using the hooks of the first insulating portion 61 of the current collector holder 60. Moreover, the engagement portions 63 (FIG. 5) of the first insulating portion 61 are engaged with the insulating plate 103. After the protrusions 61b of the first insulating portion 61 are inserted into the holes 46 of the second current collector plate 45 of the positive electrode current collector 40, the forward ends of the protrusions 61b are heat-crimped. Then the protrusion of the invertible plate 93 is fitted into a hole of the second current collector plate 45, and the hole and the protrusion are joined by laser welding at their interface.

Then the positive electrode tabs 15 are joined to the surface of the first current collector plate 41 of the positive electrode current collector 40 that faces the electrode assembly 12. With the tubular member 66 of the current collector holder 60 inserted into the through hole 42 of the first current collector plate 41, the first current collector plate 41 with the positive electrode tabs 15 joined thereto is disposed on the second insulating portion 64. In this case, the edges of the first current collector plate 41 and the edges of the second current collector plate 45 partially overlap each other, and the overlapping portions are joined together by welding. Then a cover (not shown) may be provided so as to cover the surface of the second current collector plate 45 that faces the electrode assembly 12.

As shown in FIG. 4, the electrode assembly 12 includes the two separate electrode assembly elements 12a and 12b, and the electrode assembly elements 12a and 12b are connected to the positive electrode current collector 40 and the negative electrode collector 50 (FIG. 2A). In the first current collector plate 41, with the tubular member 66 disposed between the positive electrode tabs 15 extending from the electrode assembly elements 12a and 12b, the positive electrode tabs 15 are joined to the surface of the first current collector plate 41 that faces the electrode assembly 12.

In the above electricity storage device 10, when the electrolytic solution is supplied to the exterior housing 80 through the liquid injection hole 21, the electrolytic solution impinges on the covering member 70, and the flow rate of the electrolytic solution is thereby reduced. Then this electrolytic solution flows toward the electrode assembly 12 within the exterior housing 80. Therefore, the flow rate of the electrolytic solution when it comes into collision with the upper edge of the electrode assembly 12 within the exterior housing 80 can be reduced. This can prevent the material of the electrode assembly 12 from being damaged, delaminated, and flaked off. Moreover, the gap between the lid 20 and the electrode assembly can be reduced. Therefore, the electricity storage device 10 obtained can have a high volumetric energy density and high reliability.

In the electrode assembly 12, the positive electrode plates 13 and the negative electrode plates 16 are stacked through the separators. In the electrode assembly 12, the stacking direction of the positive electrode plates 13, the separators, and the negative electrode plates 16 is orthogonal to the vertical direction Z that is the direction from the electrode assembly to the lid. In this case, the electrolytic solution tends to impinge on overlapping portions of the edges of the positive electrode plates 13, the separators, and the negative electrode plates 16. However, even in this case, delamination and flaking of materials can be prevented, and the effect of the present disclosure is significant. For example, when the stacking direction of the positive electrode plates 13, the negative electrode plates 16, and the separators is orthogonal to the vertical direction Z, edges of the positive electrode plates, the negative electrode plates, and the separators stacked together are located at the upper edge of the electrode assembly 12. In this structure, when the electrolytic solution impinges at high speed on the edge of the electrode assembly 12, the separators bonded to the electrode plates may be delaminated from the electrode plates, or the active material layers in the electrode plates may be flaked off.

However, with the structure of the present disclosure, the occurrence of these problems can be prevented. Therefore, even when the electrode assembly used for the electricity storage device of the present disclosure is not a stacked electrode assembly but is a wound electrode assembly in which its winding axis is disposed so as to extend from electrode assembly toward the lid, the stacking direction of the positive electrode plates, the negative electrode plates, and the separators is orthogonal to the vertical direction Z, and therefore the effect of reducing the damage to the electrode assembly is sufficiently high.

In the above covering member 70, its portion facing the electrode assembly 12 and the liquid injection hole 21 has a plate shape, and the first direction in which this portion extends is parallel to the widthwise direction of the lid 20. In this case, the directions of the electrolytic solution injected from the lower side of the tubular member 66 are substantially parallel to the lengthwise direction X within the internal space of the cuboidal exterior housing 80 that is formed according to the shape of the lid 20. In this case, the electrolytic solution can be injected into a large space in the exterior housing 80. Therefore, the flow rate of the electrolytic solution when it impinges on the electrode assembly 12 can be reduced.

The two openings 73 formed at the end portions of the tubular member 66 that face the electrode assembly 12 are spaced apart from each other through the covering member 70 in the lengthwise direction X, "a." With this structure, the electrolytic solution flowing toward the electrode assembly 12 can be dispersed within the exterior housing 80, and the electrode assembly 12 can be further prevented from being damaged, delaminated, and flaked off. In this case, when part of the edges of the openings 73 are higher than the upper surface of the covering member 70, the electrolytic solution injected from the openings 73 can be spread and dispersed over a wider area and then allowed to flow toward the electrode assembly 12, so that the flow rate of the electrolytic solution when it impinges on the electrode assembly 12 can be easily reduced.

It is unnecessary that the covering member 70 be composed of only one member, and the covering member 70 may have a shape including a plurality of members connected to the tubular member 66. In this case, a plurality of covering members may be disposed in the tubular member 66 at different heights. For example, opposite ends, with respect to the first direction, i.e., the widthwise direction, of the covering member may be connected to two positions of the tubular member, and the covering member may extend in the widthwise direction. The end of the tubular member 66 that faces the electrode assembly 12 may be covered with the covering member 70, and at least one opening for injecting the electrolytic solution may be formed on the outer circumferential surface of the tubular member 66.

The covering member 70 may be disposed at the lower one of the opposite ends, with respect to the vertical direction, of the tubular member 66, e.g., near the lower end of the tubular member 66. In this structure, the nozzle of a supply source for supplying the electrolytic solution can be introduced into the tubular member 66 through the liquid injection hole 21. Therefore, the electrolytic solution supplied from the nozzle can be prevented from being spread outside the exterior housing 80. Moreover, it is easy to prevent the nozzle from colliding with the covering member, and a sufficient space can be provided between the nozzle and the covering member. Therefore, a flow path of the electrolytic solution from the nozzle toward the covering member can be easily provided, and the electrolytic solution can be supplied from the nozzle to the exterior housing 80 without interference.

The tubular member 66 has, on its outer circumferential surface, the two flat portions 67, and has an elliptical cross-sectional shape. When the positive electrode tabs 15 are joined to the first current collector plate 41 of the positive electrode current collector 40, the unjoined positive electrode tabs 15 can be brought into abutment with the flat portions 67 of the tubular member 66. In this case, the arrangement of the unjoined positive electrode tabs 15 can be stabilized. Moreover, after the tubular member 66 is inserted into the through hole 42 of the first current collector plate 41, the first current collector plate 41 can be prevented from rotating about the tubular member 66.

Figure 9:
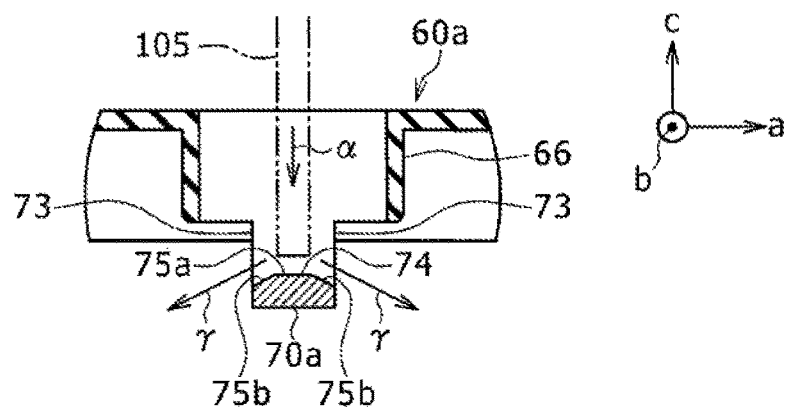
FIG. 9 is an illustration corresponding to region IX in FIG. 8 in another example of the embodiment of the present disclosure.
Figure 10:
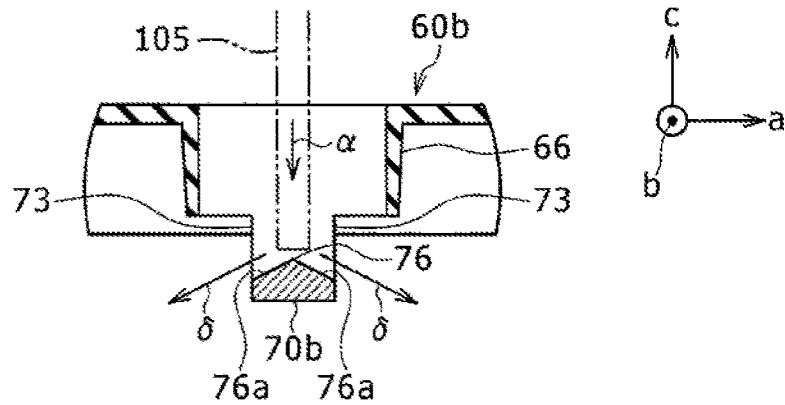
FIG. 10 is an illustration corresponding to region X in FIG. 8 in another example of the embodiment of the present disclosure.

FIGS. 9 and 10 are illustrations each corresponding to region IX, X in FIG. 8 in other examples of the embodiment of the present disclosure. In the structure shown in the example in FIG. 9, a covering member 70a is connected to a tubular member 66 of a current collector holder 60a. The covering member 70a has a protrusion 74 on its upper surface that faces the liquid injection hole 21 (FIG. 8). The protrusion 74 has a substantially mountain-shaped cross section. The protrusion 74 includes, on its upper surface, a flat intermediate portion 75a orthogonal to the vertical direction and two flat outer portions 75b adjacent to the opposite ends of the flat intermediate portion 75a and inclined with respect to the vertical direction. Each of the flat outer portions 75b corresponds to the inclined surface in the claims. In this case, a cross section of the protrusion 74 that is perpendicular to the first direction (the widthwise direction "b") has a trapezoidal shape. Therefore, the direction of the flow of the electrolytic solution flowing through the nozzle 105 is changed from a direction indicated by an arrow α, i.e., a downward direction, to directions indicated by arrows γ, i.e., obliquely downward directions, and then the electrolytic solution is injected from the two openings 73 into the exterior housing 80 (FIGS. 2A and 8).

In the structure in the example shown in FIG. 10, a covering member 70b is connected to a tubular member 66 of a current collector holder 60b. The covering member 70b has a protrusion 76 on its upper surface that faces the liquid injection hole 21 (FIG. 8). The protrusion 76 has a substantially mountain-shaped cross section. The protrusion 76 includes, on its upper surface, two flat portions 76a inclined in opposite directions with respect to the vertical direction. In this case, a cross section of the protrusion 76 that is perpendicular to the first direction (the widthwise direction "b") has a triangular shape. Each of the flat portions 76a corresponds to the inclined surface in the claims. Therefore, the direction of the flow of the electrolytic solution flowing through the nozzle 105 is changed from a direction indicated by an arrow α, i.e., a downward direction, to directions indicated by arrows δ, i.e., obliquely downward directions, and then the electrolytic solution is injected from the two openings 73 into the exterior housing 80 (FIGS. 2A and 8).

Opposite ends of the covering member 70 in the first direction (the widthwise direction "b"), i.e., its extending direction, may be disposed so as to face positive electrode tabs 15 or negative electrode tabs 18. In this structure, the electrolytic solution is easily injected from the openings 73 in directions parallel to the surfaces of the tabs that face the covering member 70. Therefore, the electrolytic solution can be prevented from being injected toward the tabs. Since the electrolytic solution is prevented from being injected from the tubular member 66 toward the tabs, the tabs can be easily disposed so as to face the tubular member 66. When tabs and the tubular member 66 face each other, damage to, particularly, electrode plates connected to the tabs facing the tubular member 66 (the tabs closest to the tubular member 66) is reduced. In particular, damage to the active material layers of the electrode palates that face the tubular member 66 or separators facing the active material layers can be reduced.

The shape of the covering member 70, 70a, 70b included in the structure in the present disclosure is not limited to the structures in the above examples. For example, the covering member may have a protrusion on its upper surface, and the protrusion may have a curved upper surface that bulges upward along curves. For example, the protrusion may have a curved surface having an arc-shaped or semicircular cross section perpendicular to the first direction, i.e., the extending direction of the covering member.

In the above description, the electrode assembly 12 includes the two separate electrode assembly elements 12a and 12b, and the positive electrode tabs 15 and the negative electrode tabs 18 extend from the electrode assembly elements. However, the electrode assembly 12 may include only one electrode assembly element having positive electrode tabs and negative electrode tabs.

In the description of the above embodiment, the tubular member 66 and the covering member 70, 70a, 70b are part of the current collector holder 60, 60a, 60b, but the electricity storage device of the present disclosure is not limited to this structure. For example, the second insulating portion 64 of the current collector holder and the first current collector plate 41 may not be located near the circumferential edge of the liquid injection hole 21, and the second insulating portion 64 and the first current collector plate 41 may be spaced apart from the circumferential edge of the liquid injection hole 21. In this case, a current collector holder having no tubular member and no covering member and an insulating member having a tubular member and a covering member may be provided, and the insulating member may be disposed near the liquid injection hole 21 to configure the electricity storage device of the present disclosure. In this case also, the tubular member is disposed between the outer surface of the lid and the electrode assembly. Part of the insulating plates 102 and 103 may extend to the vicinity of the liquid injection hole 21, and the tubular member 66 may be fixed to the extended portions. It is unnecessary that the tubular member be made of an insulating material. For example, a metallic tubular member and a metallic covering member may be used. The tubular member may be configured as a tubular member that is integrated with the lid, disposed on the electrode assembly side, placed between the outer surface of the lid and the electrode assembly, and extends from the lid toward the electrode assembly so as to surround the opening of the liquid injection hole on the surface of the lid that faces the electrode assembly. As described above, the tubular members and the lid may be separate members or may be integrated with each other.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. An electricity storage device comprising:
   an electrode assembly including a first electrode plate, a second electrode plate, and a separator interposed between the first electrode plate and the second electrode plate;
   an exterior housing that has an opening and houses the electrode assembly;
   a lid that covers the opening of the exterior housing and has a liquid injection hole for injecting an electrolytic solution into the exterior housing;
   electrode terminals that are electrically connected to the electrode assembly and partially protrude from the lid to the outside of the exterior housing;
   a tubular member extending from the lid toward the electrode assembly, the tubular member being disposed between an outer surface of the lid and the electrode assembly so as to surround an opening of the liquid injection hole on a surface of the lid, in which the surface faces the electrode assembly;
   a covering member that is connected to the tubular member and interposed between the liquid injection hole and the electrode assembly; and
   an insulating member disposed between the lid and the electrode assembly,
   wherein the tubular member is included in the insulating member,
   wherein the lid is a rectangular plate having a lengthwise direction and a widthwise direction, and
   wherein an inside dimension of the tubular member is larger than an inside dimension of the liquid injection hole in the lengthwise direction.

2. The electricity storage device according to claim 1, wherein, in the electrode assembly, the first electrode plate and the second electrode plate are stacked through the separator, and
   wherein, in the electrode assembly, a stacking direction of the first electrode plate, the separator, and the second electrode plate is orthogonal to a direction from the electrode assembly to the lid.

3. The electricity storage device according to claim 1, wherein the covering member is a plate extending in a first direction, and
   wherein the first direction is parallel to the widthwise direction of the lid.

4. The electricity storage device according to claim 1, wherein the covering member has a protrusion on a surface thereof that faces the liquid injection hole.

5. The electricity storage device according to claim 4, wherein the covering member is a plate extending in a first direction parallel to the widthwise direction of the lid, and
   wherein the protrusion has a curved surface or an inclined surface inclined with respect to a direction orthogonal to the first direction.

6. The electricity storage device according to claim 1, wherein the tubular member has opposite ends in a direction from the lid toward the electrode assembly, and the covering member is formed at one of the opposite ends that faces the electrode assembly.

7. The electricity storage device according to claim 1, further comprising
   current collectors that are disposed between the lid and the electrode assembly and electrically connect the electrode assembly to the electrode terminals,
   wherein the insulating member is disposed between the lid and one of the current collectors,
   wherein the one of the current collectors has a through hole on a surface thereof facing the insulating member, and
   wherein the tubular member is inserted into the through hole.

8. The electricity storage device according to claim 7, wherein the first electrode plate includes an extending tab,
   wherein the tab is connected to a surface of the one of the current collectors that faces the electrode assembly, and
   wherein a forward end of the tab faces a side surface of the tubular member passing through the through hole.

9. The electricity storage device according to claim 8, wherein the covering member is a plate extending in a first direction parallel to the widthwise direction of the lid, and
   wherein an end of the covering member in the first direction faces the tab.

10. The electricity storage device according to claim 1, wherein the first electrode plate includes a tab extending to the lid and electrically connecting to one of the electrode terminals,
    wherein the covering member overlaps the tab in the widthwise direction.

11. The electricity storage device according to claim 1, wherein an outer circumferential surface of the tubular member includes a pair of flat portions extending parallel to the lengthwise direction.

12. The electricity storage device according to claim 1, wherein the tubular member includes a thicker portion than an another portion of tubular member, which is located farther than the thicker portion from the covering member.

* * * * *